United States Patent [19]

Nakanowatari et al.

[11] Patent Number: 4,725,517
[45] Date of Patent: Feb. 16, 1988

[54] METHOD OF MANUFACTURING A LIQUID CRYSTAL DISPLAY DEVICE

[75] Inventors: Jun Nakanowatari; Yoshinori Kato, both of Miaygi, Japan

[73] Assignee: Alpine Electronics Inc., Japan

[21] Appl. No.: 938,333

[22] Filed: Dec. 4, 1986

Related U.S. Application Data

[63] Continuation of Ser. No. 764,876, Aug. 12, 1985, abandoned.

[30] Foreign Application Priority Data

Aug. 12, 1985 [JP] Japan ................... 59-167454

[51] Int. Cl.⁴ ............................ G02F 1/133
[52] U.S. Cl. ..................... 430/20; 430/319;
    430/325; 430/328; 430/330; 350/340; 350/344
[58] Field of Search ............ 430/20, 394, 319, 327,
    430/328, 325, 330; 350/336, 344, 333, 339 R,
    340; 428/1

[56] References Cited

U.S. PATENT DOCUMENTS 3,912,366 10/1975 Sprokel .................. 350/160 LC
4,539,288 9/1985 Merrem et al. ................ 430/325

FOREIGN PATENT DOCUMENTS 57-34520 2/1982 Japan ................... 350/336
2131194 6/1984 United Kingdom ................ 428/1

Primary Examiner—John E. Kittle
Assistant Examiner—José G. Dees
Attorney, Agent, or Firm—Guy W. Shoup

[57] ABSTRACT

A method of manufacturing a liquid crystal display device includes the steps of forming a transparent electrode on a surface of a substrate, patterning the transparent electrode, coating a photosensitive layer of resin on the patterned transparent electrode, radiating ultraviolet radiation on a region of the photosensitive layer which will serve as a spacer to provide a gap between the substrate and a companion substrate to be combined therewith, radiating weak ultraviolet radiation on the photosensitive layer from the reverse side of the substrate, and developing the photosensitive layer to form the spacer and an alignment film simultaneously.

5 Claims, 5 Drawing Figures

METHOD OF MANUFACTURING A LIQUID CRYSTAL DISPLAY DEVICE

This is a continuation application from application Ser. No. 764,876 filed Aug. 12, 1985 now abandoned.

BACKGROUND OF THE INVENTION

The present invention relates to a method of manufacturing a liquid crystal display device having a small cell gap, the method being suitable for the fabrication of liquid crystal display devices employing smectic liquid crystal.

Twisted nematic liquid crystal display devices (hereinafter referred to as a TN liquid crystal display device) heretofore used in watches and desktop calculators, for example, are manufactured by coating, by screen printing, a thermosetting adhesive such as an epoxy-based adhesive around a substrate comprising a sheet of glass or a plastic film with a transparent electrode formed thereon, thereafter bonding a pair of such substrates confronting each other with a gap of about 10 $\mu$m left therebetween, and hardening the adhesive with heat.

Various methods have generally been employed to keep the pair of substrates spaced by the fixed gap. One method is to mix powder such as of aluminum oxide having uniform grain diameters or polymer beads of uniform grain diameters into the sealing adhesive for the substrates. According to another method, the above grainy material is dispersed in the cell so as to be uniform in density. Alternatively, short glass fibers of uniform diameter may be employed instead of the above spherical spacer.

However, in a liquid crystal display device employing a chiral smectic C phase, for example, it is necessary to select the gap between the pair of substrates to be smaller than a few $\mu$m, and for this reason it is necessary to use spacers having diameters which are fractions of the diameters of the spacers which are employed in ordinary TN liquid crystal display devices. Such spacers of small diameters below a few $\mu$m are expensive and must be handled with care.

One method of reducing the gap between the substrates would be to cut off a thin film of a polymer such as polyester and place it as a spacer between the substrates. However, this method is not practical as it would be difficult to cut and handle the film.

SUMMARY OF THE INVENTION

With the prior-art problems in view, it is an object of the present invention to provide a method of manufacturing a liquid crystal display device while forming a cell gap of less than a few $\mu$m in an easy process and with good reproduceability.

According to the present invention, there is provided a method of manufacturing a liquid crystal display device, comprising the steps of forming a transparent electrode on a surface of a substrate, patterning the transparent electrode, coating a photosensitive layer of resin on the patterned transparent electrode, radiating ultraviolet radiation on a region of the photosensitive layer which will serve as a spacer to provide a gap between the substrate and a companion substrate to be combined therewith, radiating weak ultraviolet radiation on the photosensitive layer from the reverse side of the substrate, and developing the photosensitive layer to form the spacer and an alignment film simultaneously.

With this method, the spacer and the alignment film can be simultaneously formed by coating the photosensitive layer on one of the substrates and irradiating the photosensitive layer with ultraviolet radiation. Therefore, the efficiency of the manufacturing process is increased and the spacer can easily be produced in a thickness range below a few $\mu$m.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
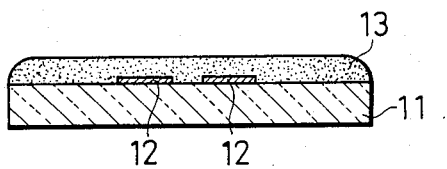
FIG. 1 is a cross-sectional view showing a photosensitive layer of polyimide coated on a substrate with a spinner process and pre-baked.

As shown in FIG. 1, transparent electrode 12 is formed on a transparent substrate 11 made of glass or plastic film, for example, and is patterned. Then, the transparent electrode 12 is coupled to the substrate 11, and thereafter a photosensitive layer 13 of resin is coated on the substrate 11 with a spinner process or the like and is pre-based, if necessary. The photosensitive layer 13 may be of photosensitive polyimide, for example.

Figure 2:
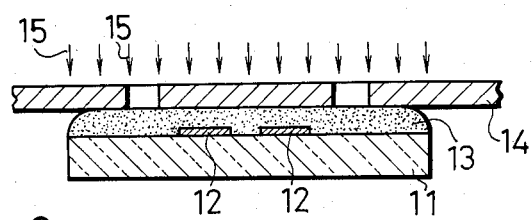
FIG. 2 is a cross-sectional view showing the manner in which a spacer region on the photosensitive layer is irradiated with ultraviolet radiation.

Then, as shown in FIG. 2, a spacer exposure mask 14 is covered on the substrate 11, and spacer regions on the photosensitive layer 13 are irradiated with ultraviolet radiation through holes in the spacer exposure mask 14. The irradiated photosensitive layer 13 is polymerized and becomes insoluble with respect to a developing solution.

Figure 3:
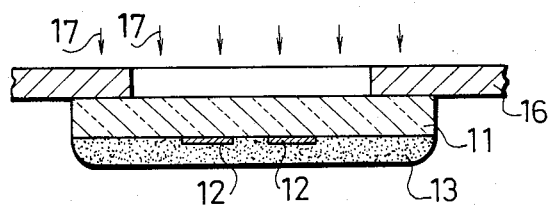
FIG. 3 is a cross-sectional view showing the manner in which the photosensitive layer is irradiated with ultraviolet radiation for forming an alignment film.

As illustrated in FIG. 3, an alignment film exposure mask 16 is covered on the reverse side of the substrate 11, and a display section on the photosensitive layer 13 is irradiated with weak ultraviolet radiation through a hole in the alignment film exposure mask 16. The portion of the photosensitive layer 13 which contacts the substrate 11 is polymerized and rendered insoluble with respect to the developing solution. It would be possible to form a thin alignment film after development by irradiating the face of the substrate with weak ultraviolet radiation 17 as adjusted in radiating quantity. With this alternative, however, the film thickness would be more irregular, tend to become white in color, and poorer in surface condition than the reverse side of the substrate 11 is irradiated.

Figure 4:
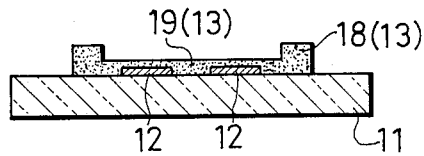
FIG. 4 is a cross-sectional view illustrating a construction after having been developed.

When the photosensitive layer 13 thus exposed is developed, a spacer 18 and an alignment film 19 are simultaneously formed as illustrated in FIG. 4. The photosensitive layer 13 is cured and hardened as required.

Figure 5:
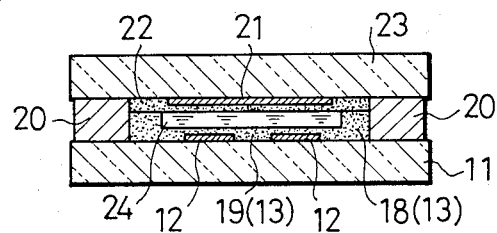
FIG. 5 is a cross-sectional view of an arrangement in which a liquid crystal is sealed in an assembled cell.

After the alignment film 19 has been aligned in a certain direction, a sealing adhesive 20 is coated on a peripheral edge of the substrate 11 as by relief printing as shown in FIG. 5. A companion substrate 23 with a transparent electrode 21 and an alignment film 22 formed thereon is bonded to the substrate 11 by the sealing adhesive 20, which is then hardened, thus forming a cell. Finally, a liquid crystal 24 is injected into the cell through an injection hole, which is then sealed to produce a liquid crystal display device.

With the liquid crystal display device thus fabricated, the gap between the the confronting substrates 11, 22 is quite small, such as below a few $\mu$m. The alignment film 19 is kept in a good condition.

EXAMPLE

A transparent electrode was formed on a surface of a substrate made of borosilicate glass which was ground to keep any surface undulations below 1 $\mu$m, and the transparent electrode was then etched to a prescribed pattern. The etched transparent electrode was coupled to the surface of the glass substrate, and thereafter a layer of photosensitive polyimide "Photoneece UR-3100" (commercial name, manufactured by Toray Co., Ltd.) was coated by a spinner at 3000 rpm. The coated photosensitive layer was then pre-baked at 80° C. for 60 minutes.

Then, the photosensitive layer was covered with a spacer exposure mask having a slit having a width of 100 $\mu$m corresponding to a spacer to be formed, and exposed by ultraviolet radiation in 300 mJ/cm$^2$ with a large-size mask alignment apparatus M3LD (manufactured by Mikasa Co., Ltd.).

An alignment film exposure mask was covered on the reverse side of the glass substrate, and a display section was exposed with ultraviolet radiation in 40 mJ/cm$^2$ with the same exposure machine as referred to above.

After the exposure, the layer was developed for one minute with a developing solution prepared for exclusive use for developing the layer to form a spacer 100 $\mu$m wide and 2 $\mu$m high, and an alignment film having a thickness ranging from 1500 to 3000 A in the display section. After the spacer and the alignment film have simultaneously been fabricated, the assembly was cured at 350° C. for 15 minutes to harden the polyimide film.

After the alignment film has been aligned in a certain direction, a ultraviolet-curing adhesive was coated on a peripheral edge of the glass substrate in relief printing. Companion glass substrates were bonded together and irradiated with ultraviolet radiation under pressure to cure the adhesive.

The cell thus manufactured had a gap in the range of from 1 to 2 $\mu$m, and the gap and the aligned condition were subjected to small irregularities. No special skill was required on the part of the worker in manufacturing the above cell.

With the present invention, as described above, one of the substrates is coated with a photosensitive layer of resin, a spacer region on the photosensitive layer is irradiated with ultraviolet radiation, and a display section on the photosensitive layer is irradiated with weak ultraviolet radiation from the reverse side of the substrate, so that a spacer and an alignment film will be formed simultaneously. Therefore, a liquid crystal display device can be manufactured having a cell gap of less than a few $\mu$m in a relatively simple method with good reproduceability. The liquid crystal display devices produced in the method of the invention has reduced characteristic variations and can be manufactured less costly.

Although a certain preferred embodiment has been shown and described, it should be understood that many changes and modifications may be made therein without departing from the scope of the appended claims.

What is claimed is:

1. A method of manufacturing a liquid crystal display device, comprising the steps of:
   (a) forming a transparent electrode film on one surface of a transparent substrate;
   (b) patterning the transparent electrode film in a desired electrode pattern;
   (c) coating a photosensitive layer of resin over the surface of the substrate and the electrode pattern;
   (d) placing a spacer exposure mask, which has a through hole corresponding to a spacer to be formed in the photosensitive layer of resin, over the resin layer, and radiating ultraviolet radiation on said mask and through said hole to form a polymerized region, insoluble to a developer solution, in the photosensitive layer which will serve as a spacer to provide a gap between the substrate and a companion substrate to be combined therewith;
   (e) placing an alignment film exposure mask, which has a through hole corresponding to an alignment film to be formed in the photosensitive layer over the electrode pattern, on the reverse side of the transparent substrate, and radiating weaker ultraviolet radiation on the photosensitive layer through said mask from the reverse side of said transparent substrate to form a polymerized thin film, insoluble to a developer solution, in the photosensitive layer which will serve as an alignment film; and
   (f) developing said photosensitive layer in a developer solution to form the spacer and the alignment film from said radiated, insoluble areas simultaneously.

2. A method according to claim 1, further including the steps of applying an ultraviolet-curing adhesive to a peripheral edge of said substrate, bonding said substrate and the companion substrate to each other with said adhesive, and curing said adhesive with ultraviolet radiation.

3. A method according to claim 1, further including the step of pre-baking said photosensitive layer coated on said substrate.

4. A method according to claim 1, wherein said photosensitive layer is formed of photosensitive polyimide.

5. A method according to claim 1, wherein the spacers are formed to have a thickness in the range of 1 to 2 $\mu$m, and the alignment layer has a thickness ranging from 1500 to 3000 A.

* * * * *